United States Patent [19]

Yoshimoto et al.

[11] Patent Number: 5,197,048
[45] Date of Patent: Mar. 23, 1993

[54] MAGNETO-OPTIC RECORDING MEDIUM, MAGNETO-OPTIC RECORDING SYSTEM AND MAGNETO-OPTIC RECORDING METHOD

[75] Inventors: Kyosuke Yoshimoto; Osamu Ito; Kunimaro Tanaka; Koichi Takeuchi; Isao Watanabe; Kazuhiko Tsutsumi, all of Hyogo, Japan

[73] Assignee: Mitsubishi Denki Kabushiki Kaisha, Japan

[21] Appl. No.: 770,602

[22] Filed: Oct. 3, 1991

Related U.S. Application Data

[62] Division of Ser. No. 591,610, Oct. 2, 1990.

[51] Int. Cl.⁵ .................. G11B 13/04; G11B 11/12; G11B 11/10
[52] U.S. Cl. .................. 369/13; 360/114; 360/59; 369/54; 369/58; 369/59
[58] Field of Search .............. 369/13, 14, 110, 54, 369/58, 59, 47; 360/59, 114; 365/122

[56] References Cited

U.S. PATENT DOCUMENTS

| | | | |
|---|---|---|---|
| 4,688,203 | 8/1987 | Koishi et al. | 369/111 |
| 4,855,975 | 8/1989 | Akasaka et al. | 369/13 |
| 4,910,622 | 3/1990 | Saito et al. | 369/13 |

FOREIGN PATENT DOCUMENTS

| | | | |
|---|---|---|---|
| 56-25273 | 8/1981 | Japan | 369/14 |
| 62-26680 | 2/1987 | Japan | |
| 63-108539 | 5/1988 | Japan | 360/114 |

Primary Examiner—Hoa Nguyen
Attorney, Agent, or Firm—Wolf, Greenfield & Sacks

[57] ABSTRACT

A magneto-optic recording medium has a cartridge provided with a magnetization direction indicating portion for indicating the direction of magnetization of a second magnetic layer. Alternatively, the direction of magnetization of the second magnetic layer is recorded in advance in the first magnetic layer. The direction of magnetization of the second magnetic layer indicated or recorded is detected and recognized. A magnetic field oriented in an opposite direction to the direction of magnetization detected is imparted to the magneto-optic recording medium. Alternatively, predetermined information is recorded in the first magnetic layer, the direction of magnetization of the second magnetic layer is detected on the basis of a signal reproducing that information, and the direction of a magnetic field to be applied to the magneto-optic recording medium is set on the basis of the direction of magnetization thus detected. In addition, the direction of the magnetic field to be applied to the magneto-optic recording medium is set and the output of a light beam is changed on the basis of the direction of the second magnetic layer detected.

4 Claims, 11 Drawing Sheets

+H

−H

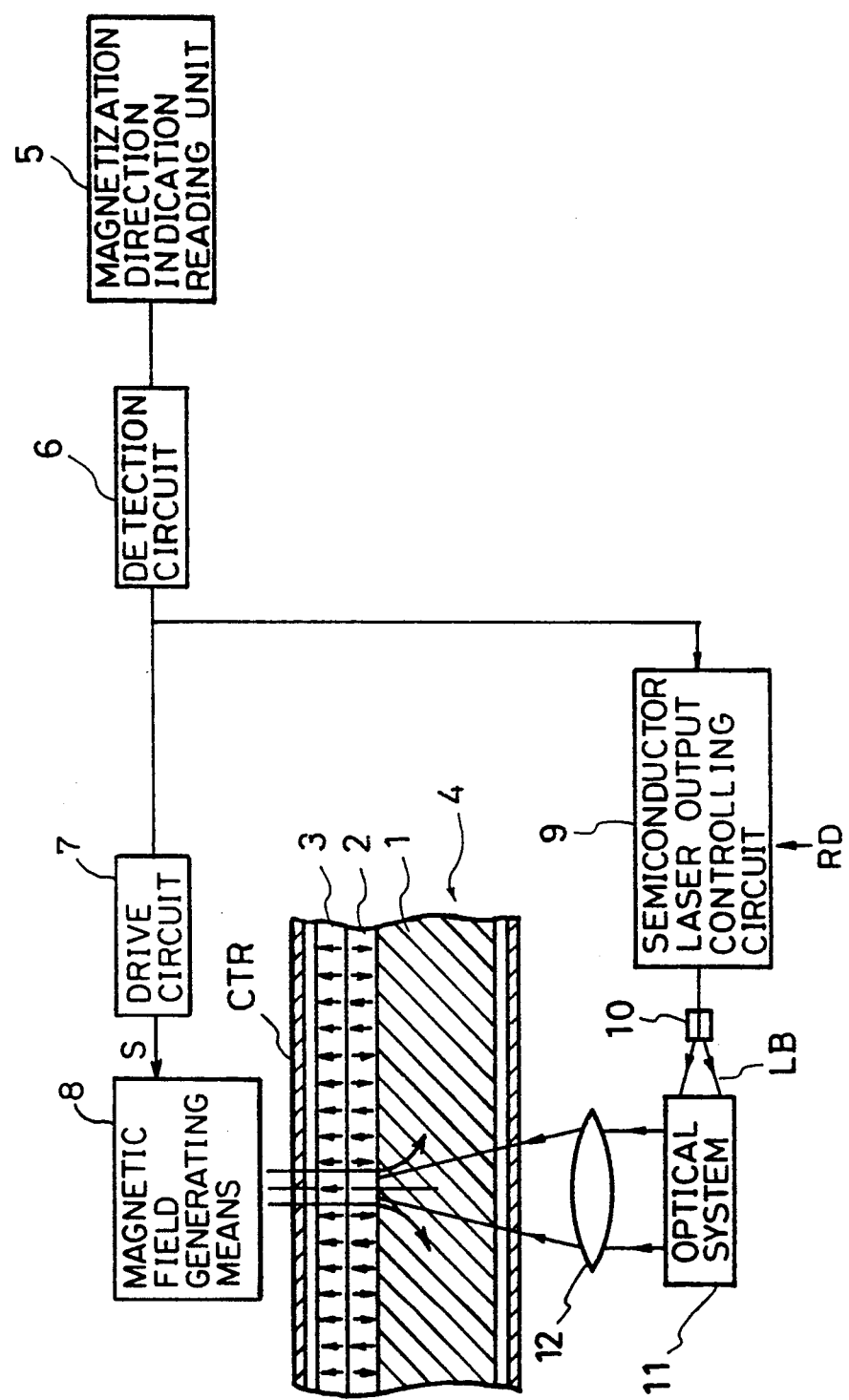

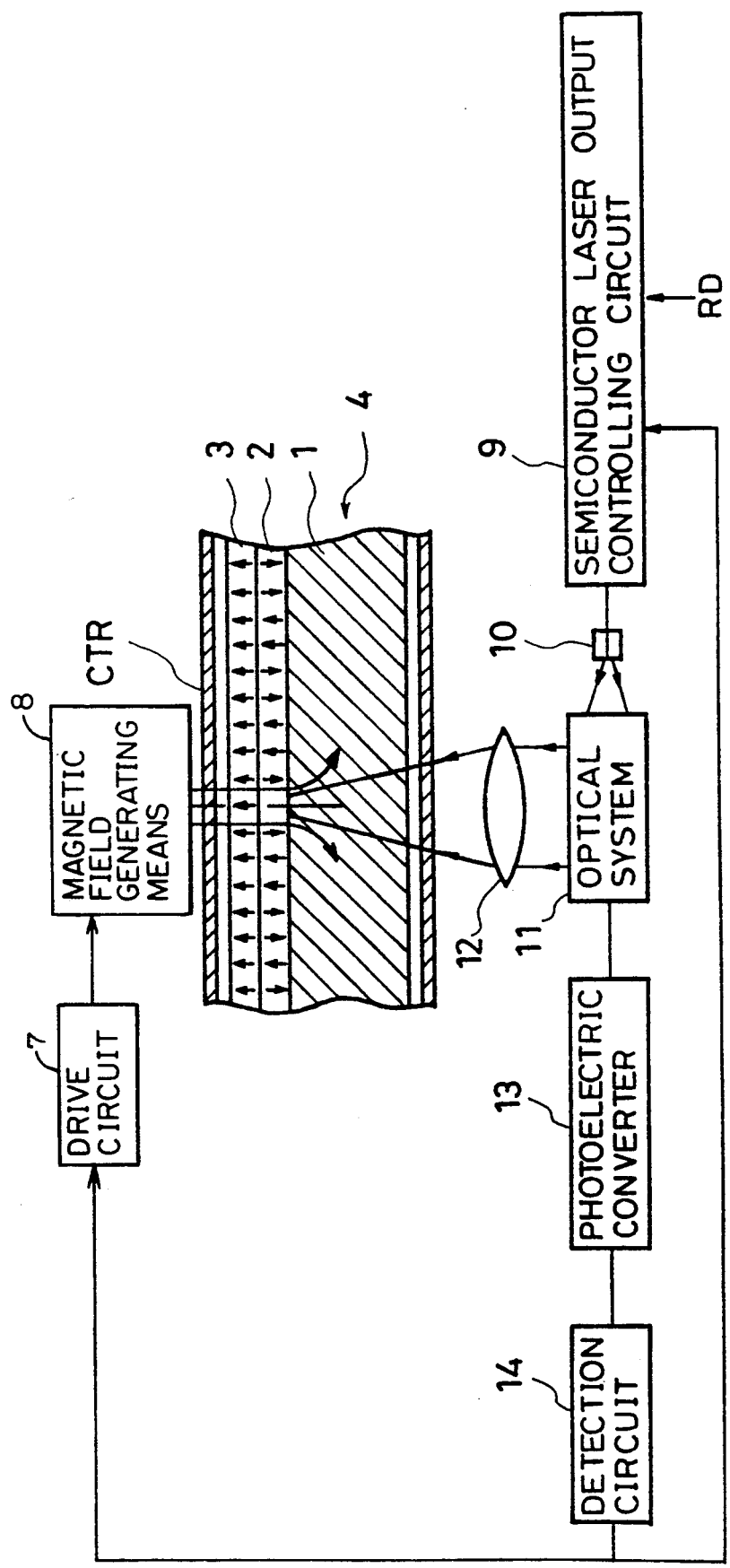

FIG. 9(A) PRIOR ART
FIG. 9(B) PRIOR ART
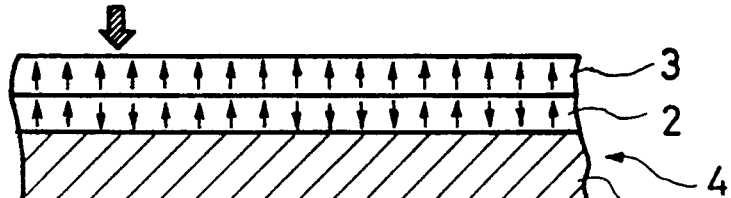
FIG. 9(C) PRIOR ART
FIG. 9(D) PRIOR ART
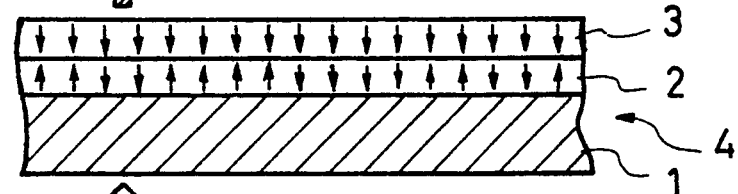
FIG. 9(E) PRIOR ART
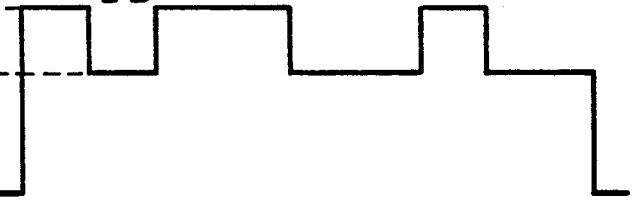

(i−1)TH LAYER
i-TH LAYER
(i+1)TH LAYER

MAGNETO-OPTIC RECORDING MEDIUM, MAGNETO-OPTIC RECORDING SYSTEM AND MAGNETO-OPTIC RECORDING METHOD

This application is a division of application Ser. No. 07/591,610 filed on Oct. 2, 1990.

BACKGROUND OF THE INVENTION

1. Field of the Invention

The present invention relates to a magneto-optic recording medium in which at least a first magnetic layer for recording information and a second magnetic layer are laminated on a substrate, a magneto-optic recording system for recording information on the magneto-optic recording medium, and a magneto-optic recording method using the magneto-recording medium.

2. Description of the Related Art

FIGS. 9A to 9E are conceptual drawings of the operation of recording and erasing information in a magneto-optic recording medium. A magneto-optic recording medium 4 is arranged such that a first magnetic layer 2 which exhibits vertical magnetic anisotropy and whose direction of magnetization is reversible is laminated on a substrate 1, and a second magnetic layer 3 which exhibits vertical magnetic anisotropy and is magnetized in one direction and whose direction of magnetization is irreversible under the same conditions as those of the first magnetic layer 2 is laminated on the first magnetic layer 2. The second magnetic layer 3 of the magneto-optic recording medium 4 shown in FIG. 9B is magnetized in an opposite direction to that of the substrate 1, i.e., in an upward direction. In addition, the second magnetic layer 3 of the magneto-optic recording medium 4 shown in FIG. 9D is magnetized in a direction toward the substrate 1, i.e., in a downward direction. Thus, in the magneto-optic recording medium 4 of this type, there are two types of the direction of magnetization of the second magnetic layer 3, i.e., one which is oriented toward the substrate, and the other which is oriented away from the substrate.

A description will now be given of the operation in a case where information is recorded or erased with respect to the magneto-optic recording medium 4 thus arranged.

First, in cases where information is recorded or erased with respect to the magneto-optic recording medium 4 whose direction of magnetization of the second magnetic layer 3 is oriented away from the substrate 1, as shown in FIG. 9B, by means of recording signals RD representing "1" and "0", as shown in FIG. 9A, the magneto-optic recording medium 4 is rotated, and a downwardly oriented external magnetic field +H which is indicated by a bold arrow and which is oriented in an opposite direction to the direction of magnetization of its second magnetic layer 3 is applied to the magneto-optic recording medium 4. During the time when the recording signal is "1", a light beam LB with high output $P_H$ in a projecting direction indicated by an outline arrow, as shown in FIG. 9C, is projected onto the first magnetic layer 2. Then, when the first magnetic layer 2 is heated by the light beam LB and reaches its Curie temperature, the direction of magnetization of the first magnetic layer 2 is reversed in the same direction as that of the external magnetic field +H, i.e., in the direction toward the substrate 1. When the light beam LB ceases to be projected due to the rotation of the magneto-optic recording medium 4, and the temperature of the first magnetic layer 2 drops, the first magnetic layer 2 remains magnetized in the direction toward the substrate 1, thereby recording information. In addition, during the time when the recording signal RD is "0", the light beam LB with low output $P_L$ is projected to the first magnetic layer 2, as shown in FIG. 9C. As a result, the coersive force of the first magnetic layer 2 declines, and the direction of magnetization of the first magnetic layer 2 is influenced by the second magnetic layer 3 and is reversed in the same direction as the direction of magnetization thereof, i.e., the first magnetic layer 2 is magnetized in the direction away from the substrate 1, thereby erasing the information.

Meanwhile, in cases where information is recorded on the magneto-optic recording medium 4 whose direction of magnetization of the second magnetic layer 3 is oriented toward the substrate 1, as shown in FIG. 9D, in the same way as described above by means of the recording signal RD shown in FIG. 9A, during the time when the recording signal RD is "1", the light beam LB with low output $P_L$ is projected onto the first magnetic layer 2. Then, the coersive force of the first magnetic layer 2 declines, and the direction of magnetization of the first magnetic layer 2 is reversed in the direction of magnetization of the second magnetic layer 3, i.e., is magnetized in the direction toward the substrate 1, thereby recording information. Meanwhile, during the time when the recording signal RD is "0", the light beam LB with high output $P_H$ is projected onto the first magnetic layer 2, as shown in FIG. 9E. As a result, the first magnetic layer 2 is heated and reaches its Curie temperature, and the direction of magnetization of the first magnetic layer 2 is reversed in the same direction as that of the external magnetic field −H, i.e., is magnetized in the direction away from the substrate 1, thereby erasing the information.

Namely, in cases where information is recorded on the magneto-optic recording medium 4, the power of the light beam LB must be set to high output $P_H$ or low output $P_L$ in correspondence with the direction of magnetization of the second magnetic layer 3.

However, with the above-described magneto-optic recording medium, there are cases where the direction of magnetization of the second magnetic layer differs depending on its manufacturer. If the direction of magnetization of the second magnetic layer thus differs, there is a drawback in that information cannot be recorded on the magneto-optic recording media unless magneto-optic recording systems suited for the respective directions of magnetization are used.

For that reason, in order to record information on the magneto-optic recording media irrespective of the manufacturers of the magneto-optic recording media, it is necessary to provide separate magneto-optic recording systems for coping with the directions of magnetization of the second magnetic layer, so that there has been the problem that the equipment costs become high.

SUMMARY OF THE INVENTION

Accordingly, an object of the present invention is to make it possible to record information in a similar state of recording irrespective of the direction of magnetization of a second magnetic layer.

To this end, a magneto-optic recording medium in accordance with the invention has a cartridge provided with a magnetization direction indicating portion for indicating the direction of magnetization of a second magnetic layer.

On the basis of the contents of the magnetization direction indicating portion provided on the cartridge of the magneto-optic recording medium, the direction of magnetization of the second magnetic layer is detected, and an external magnetic field oriented in an opposite direction to the direction of magnetization detected is imparted to the magneto-optic recording medium.

In accordance with another aspect of the invention, magnetization information on the direction of magnetization of the second magnetic layer recorded on the magneto-optic recording medium is reproduced, the direction of magnetization of the second magnetic layer is detected on the basis of a reproduced signal, and an external magnetic field oriented in an opposite direction to the direction of magnetization detected is imparted to the magneto-optic recording medium.

In accordance with still another aspect of the invention, magnetization information on the direction of magnetization of the second magnetic layer is first recorded in the magneto-optic recording medium, the direction of magnetization of the second magnetic layer is detected on the basis of a signal in which this information is reproduced, and an external magnetic field oriented in an opposite direction to the direction of magnetization detected is imparted to the magneto-optic recording medium.

In accordance with a further aspect of the invention, the direction of magnetization of the second magnetic layer is detected on the basis of the contents of the magnetization direction indicating portion provided on the cartridge of the magneto-optic recording medium, and the direction of an external magnetic field and an optical output of a light beam that are imparted to the magneto-optic recording medium are changed on the basis of the direction of magnetization detected.

In accordance with a still further aspect of the invention, magnetization information on the direction of the magnetization of the second magnetic layer is first recorded on the magneto-optic recording medium, the direction of magnetization of the second magnetic layer is detected on the basis of a signal reproducing this information, and the direction of an external magnetic field and the optical output of the light beam that are applied to the magneto-optic recording medium are changed on the basis of the direction of magnetization detected.

Other objects, features and advantages of the present invention will become more apparent from the following detailed description of the invention when read in conjunction with the accompanying drawings.

BRIEF DESCRIPTION OF THE DRAWINGS

FIG. 7 is a block diagram of essential portions of a magneto-optic recording system in accordance with a fifth aspect of the invention;

FIG. 8 is a block diagram of essential portions of a magneto-optic recording system in accordance with sixth and seventh aspects of the invention;

FIG. 9(a) illustrates a portion of a recording signal; FIG. 9(b) is a cross-sectional view of a magnetic optical recording medium in which the second magnetic layer is magnetized in an opposite direction to that of the substrate; FIG. 9(c) is a first example of the light beam output from a semiconductor laser beam; FIG. 9(d) is a cross-sectional view of a magneto-optical recording medium in which the second magnetic layer is magnetized in a direction towards the substrate; FIG. 9(e) is a second example of the light beam output from a semiconductor laser beam;

DESCRIPTION OF THE PREFERRED EMBODIMENTS

Referring now to the accompanying drawings, a description will be given of the preferred embodiments of the present invention.

Figure 1:
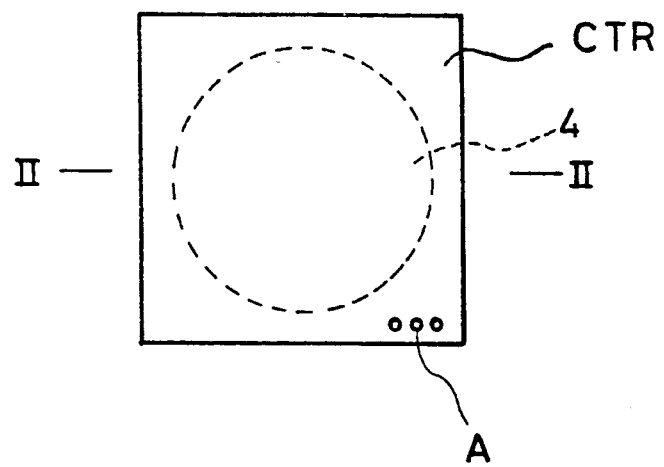
FIG. 1 is a plan view of a magneto-optic recording medium in accordance with a first aspect of the present invention.
Figure 2:
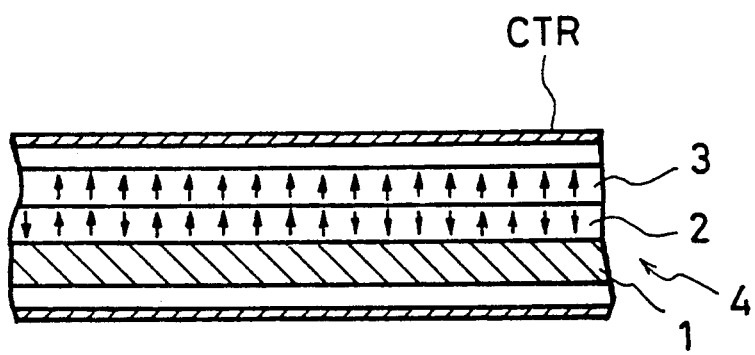
FIG. 2 is an enlarged cross-sectional view taken along the line II—II of FIG. 1.

FIGS. 1 and 2 are a plan view of a magneto-optic recording medium and an enlarged cross-sectional view thereof in accordance with a first aspect of the present invention. A magneto-optic recording medium 4 is accommodated in a cartridge CRT for accommodating the same. Provided at one corner of the cartridge CTR is a magnetization direction indicating portion A in which, for instance, three small holes (ID holes) are provided in such a manner as to be disposed on the same line in parallel with one side of the cartridge CTR at appropriately spaced intervals. This magnetization direction indicating portion A indicates the direction of magnetization of the second magnetic layer 3 which will be described later and is formed in the magneto-optic recording medium 4 accommodated in the cartridge CTR. The magneto-optic recording medium 4 is arranged such that a first magnetic layer 2 for recording information and a second magnetic layer 3 magnetized in one direction (in FIG. 2, in a direction away from a substrate 1) are formed by being laminated on the substrate 1 which is formed of glass, a plastic or the like. When this cartridge CTR is loaded in an unillustrated magneto-optic recording system, the contents of the indication of the magnetization indicating portion A are arranged to be read by the magneto-optic recording system.

Figure 3:
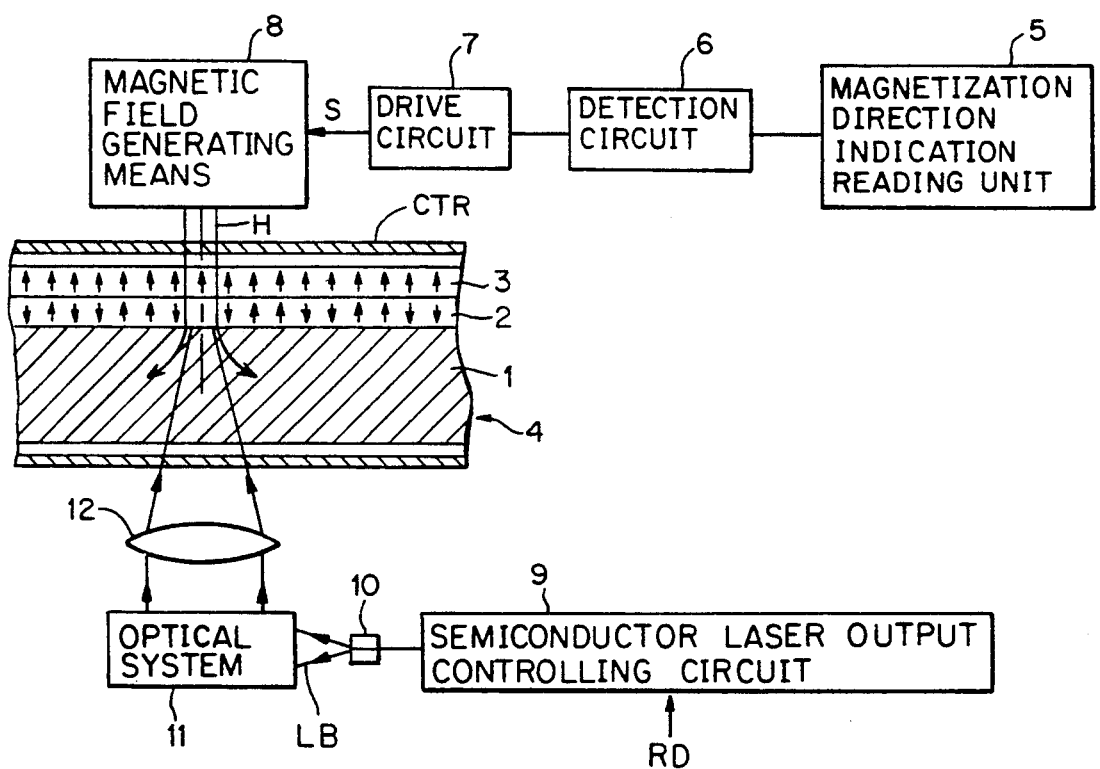
FIG. 3 is a block diagram of essential portions of a magneto-optic recording system in accordance with a second aspect of the invention.

FIG. 3 is a block diagram illustrating essential portions of a magneto-optic recording system in accordance with a second aspect of the invention. This magneto-optic recording system is so arranged that the cartridge CTR accommodating the magneto-optic recording medium 4 shown in FIG. 2 is removably inserted into the magneto-optic recording system. This magneto-optic recording system is provided with a magnetization direction indicating reading unit 5 for reading the contents of the indication of the magnetization direction indicating portion A provided in the cartridge CTR when the cartridge CTR is loaded into the magneto-optic recording system. A signal which is read by the magnetization direction indication reading unit 5 is inputted to a detection circuit 6. The detection circuit 6 recognizes and detects the indicated direction of magnetization of the second magnetic layer 3 on the basis of the signal which has been read, and inputs the detection signal to a drive circuit 7. The drive circuit 7 imparts to a magnetic field generating means 8 a drive signal S which is outputted on the basis of the direction of magnetization detected. The magnetic field generating means 8 is disposed in the vicinity of one surface of the cartridge CTR loaded in the magneto-optic recording system, i.e., the magneto-optic recording medium 4, and is arranged to impart a magnetic field to the magneto-optic recording medium 4. A recording signal RD for effecting a recording in the magneto-optic recording medium 4 is inputted to a semiconductor laser output controlling circuit 9. The semiconductor laser output controlling circuit 9 imparts to a semiconductor laser 10 an output signal for changing the optical output of the semiconductor laser 10 in response to the recording signal RD inputted. The semiconductor laser 10 emits a light beam LB whose optical output changes in response to the output signal from the semiconductor laser output controlling circuit 9, and projects the light beam LB onto a position at the other surface of the magneto-optic recording medium 4, to which a magnetic field is applied by the magnetic field generating means 8, via an optical system 11 and an objective lens 12.

Figure 4A:
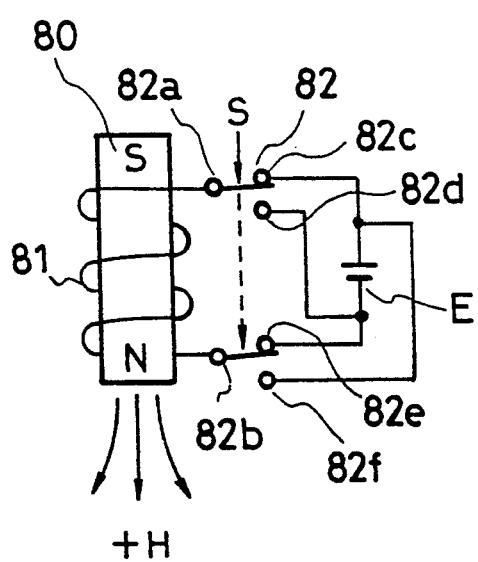
FIG. 4(a) is a schematic diagram of a switch controlled magnetic field generating means in a +H state.
Figure 4B:
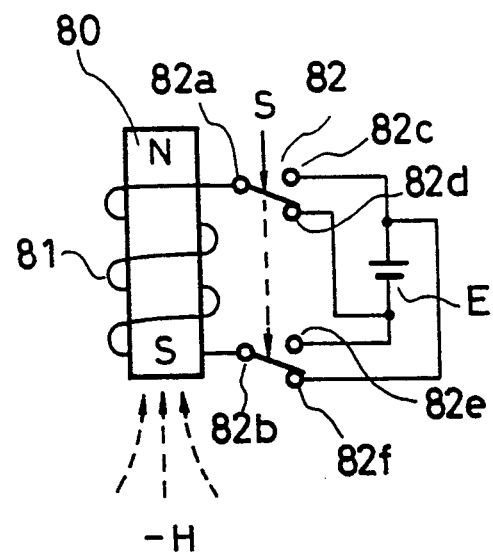
FIG. 4(b) is a schematic diagram of a switch controlled magnetic field generating means in a −H state.

FIGS. 4A and 4B are schematic diagrams of the magnetic generating means shown in FIG. 3. An exciting coil 81 is wound around a magnetic core 80 by a required number of turns. Both ends of the exciting coil 81 are respectively connected to first and second movable contacts 82a, 82b which interlinkingly operate with a changeover switch 82. The movable contacts 82a, 82b are adapted to be changed over by the signal S outputted by the drive circuit 7. The movable contact 82a is selectively changed over to first and second fixed contacts 82c, 82d, while the movable contact 82b is selectively changed over to third and fourth fixed contacts 82e, 82f. The first and fourth fixed contacts 82c, 82f are connected to a positive pole of a DC power source E, while the second and third fixed contacts are connected to its negative pole. If the movable contacts 82a, 82b are changed over to the first and third fixed contacts 82c, 82e, as shown in FIG. 4A, a magnetic field +H in a direction indicated by solid-line arrows is generated. Meanwhile, if the movable contacts 82a, 82b are changed over to the second and fourth fixed contacts 82d, 82f, as shown in FIG. 4B, a magnetic field −H, which is opposite to the magnetic field H, in a direction indicated by broken-line arrows is generated.

A description will now be given of the operation of recording information by the magneto-optic recording system thus arranged.

If the cartridge CTR accommodating the magneto-optic recording medium 4 is loaded in an unillustrated information recording apparatus so as to record information on the magneto-optic recording medium 4, the magnetization direction indication reading unit 5 reads the contents of the indication of the magnetization direction indicating portion on the cartridge CTR. The signal thus read is inputted to the detection circuit 6, which detects from the signal that the direction of magnetization of the second magnetic layer 3 is oriented away from the substrate 1. When a magnetization direction detection signal is inputted to the drive circuit 7, the drive circuit 7 imparts the drive signal S to the magnetic field generating means 8 so as to apply a magnetic field oriented in an opposite direction to the direction of magnetization detected. The changeover switch 82 of the magnetic field generating means 8 is changed over by the drive signal S. For instance, when the direction of magnetization of the second magnetic layer 3 (see FIG. 3) is oriented away from the substrate 1, by changing over the changeover switch 82 to the state shown in FIG. 4A, the +H magnetic field is imparted to the magneto-optic recording medium 4, as shown in FIG. 9B. Then, if the recording signal RD, shown in FIG. 9A, for recording information is inputted to the semiconductor laser output controlling circuit 9, the semiconductor laser output controlling circuit 9 imparts to the semiconductor laser 10 a signal for emitting the light beam LB of high output $P_H$ during the time when the recording signal RD is "1", as shown in FIG. 9C. As a result, the semiconductor laser 10 emits the light beam LB of high output $P_H$, and projects it onto the first magnetic layer 2 of the magneto-optic recording medium 4 via the optical system 11 and the objective lens 12. Then, when the first magnetic layer 2 is heated by the light beam LB and reaches its Curie temperature, the direction of magnetization of the first magnetic layer 2 is reversed in the direction of the magnetic field of the magnetic field generating means 8, and with the rotation of the magneto-optic recording medium 4, the light beam LB ceases to be applied to the position to which the light beam LB was applied. Hence, since the temperature of the first magnetic layer 2 drops, the first magnetic layer 2 remains magnetized in the same direction as that of the magnetic field of the magnetic field generating means 8, i.e., in the direction oriented toward the substrate 1, thereby recording information. On the other hand, during the time when the recording signal RD is "0", the light beam LB of low output $P_L$ is projected onto the first magnetic layer 2, as shown in FIG. 9C. As a result, the coersive force of the first magnetic layer 2 declines, and the first magnetic layer 2 is magnetized in the same direction as the direction of magnetization of the second magnetic layer 3 due to its influence, i.e., in the direction away from the substrate 1, thereby erasing the information.

Meanwhile, in cases where another cartridge CTR accommodating the magneto-optic recording medium 4 (see FIG. 9D) in which the direction of magnetization of the second magnetic layer 3 of the magneto-optic recording medium 4 shown in FIG. 3 is opposite, i.e., oriented toward the substrate 1, is loaded in the magneto-optic recording system, the direction of magnetization of the second magnetic layer 3 of the magneto-optic recording medium 4 is detected on the basis of the result of reading of the contents of the magnetization direction indicating portion A in the cartridge CTR, in the same way as described above. The changeover switch 82 of the magnetic field generating means 8 undergoes a switching operation shown in FIG. 4B in accordance with the direction of magnetization detected, with the result that the magnetic field generating means 8 generates the −H magnetic field. Thus, the −H magnetic field is imparted to the magneto-optic recording medium 4, as shown in FIG. 9D.

Then, if the recording signal RD shown in FIG. 9A is inputted to the semiconductor laser output controlling circuit 9, the semiconductor laser output controlling circuit 9 controls the optical output of the semiconductor laser 10, as shown in FIG. 9C. As a result, during the time when the recording signal RD is "1", the semiconductor laser 10 emits the light beam LB of high output $P_H$, as shown in FIG. 9C, so that the first magnetic layer 2 is magnetized in the same direction as that of the −H magnetic field of the magnetic field generating means 8, thereby erasing the information. Meanwhile, during the time when the recording signal RD is "0", the semiconductor laser 10 emits the light beam LB of low output $P_L$, as shown in FIG. 9C, so that the first magnetic layer 2 is magnetized in the same direction as that of the second magnetic layer 3, thereby recording information. With this magneto-optic recording system, even if the recording signal is identical, the recorded state of the information recorded in the first magnetic layer 2 becomes contradictory if the direction of magnetization of the second magnetic layer 3 of the magneto-optic recording medium 4 is different.

Figure 5A:
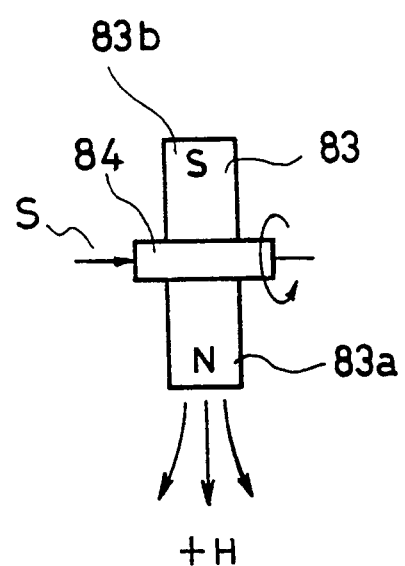
FIG. 5(a) is a schematic diagram of a fulcrum controlled magnetic field generating means in a +H state.
Figure 5B:
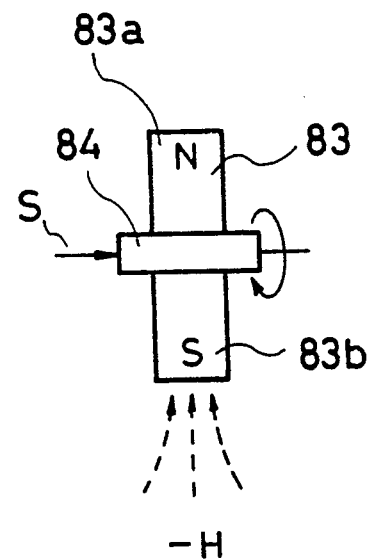
FIG. 5(b) is a schematic diagram of a fulcrum controlled magnetic field generating means in a −H state.

It should be noted that although the aforementioned magnetic field generating means 8 is arranged to reverse the direction of the magnetic field imparted to the magneto-optic recording medium 4 by reversing the direction of current flowing across the exciting coil 81, a permanent magnet 83 may be used as the magnetic field generating means 8, as shown in FIGS. 5A and 5B.

In FIGS. 5A and 5B, the permanent magnet 83 has a configuration of a rectangular parallelepiped, and its one end portion 83a constitutes an N pole, while the other end portion thereof constitutes an S pole. A longitudinally central portion of this permanent magnet 83 is supported by a rotatively driving portion 84. When the signal S outputted by the drive circuit 7 is imparted to the rotatively driving portion 84, the permanent magnet 83 rotates 180 degrees with the rotatively driving portion 84 as a fulcrum, whereby the positions of the one end portion 83a and the other end portion 83b, i.e., the positions of the N and S poles, can be reversed, so that the direction of the magnetic field imparted to the magneto-optic recording medium 4 can be reversed in the same way as the magnetic field generating means 8 shown in FIG. 3.

If the cartridge CTR accommodating the magneto-optic recording medium 4 is provided with the indicating portion for indicating the direction of magnetization of the second magnetic layer 3, as the cartridge CTR is loaded in the magneto-optic recording system, the magneto-optic recording system is adapted by the drive circuit 7 in such a manner that the direction of the magnetic field of the magnetic field generating means 8 becomes opposite to the direction of magnetization of the second magnetic layer 3, as described before. As a result, information can be recorded irrespective of the direction of magnetization of the second magnetic layer 3.

Figure 6:
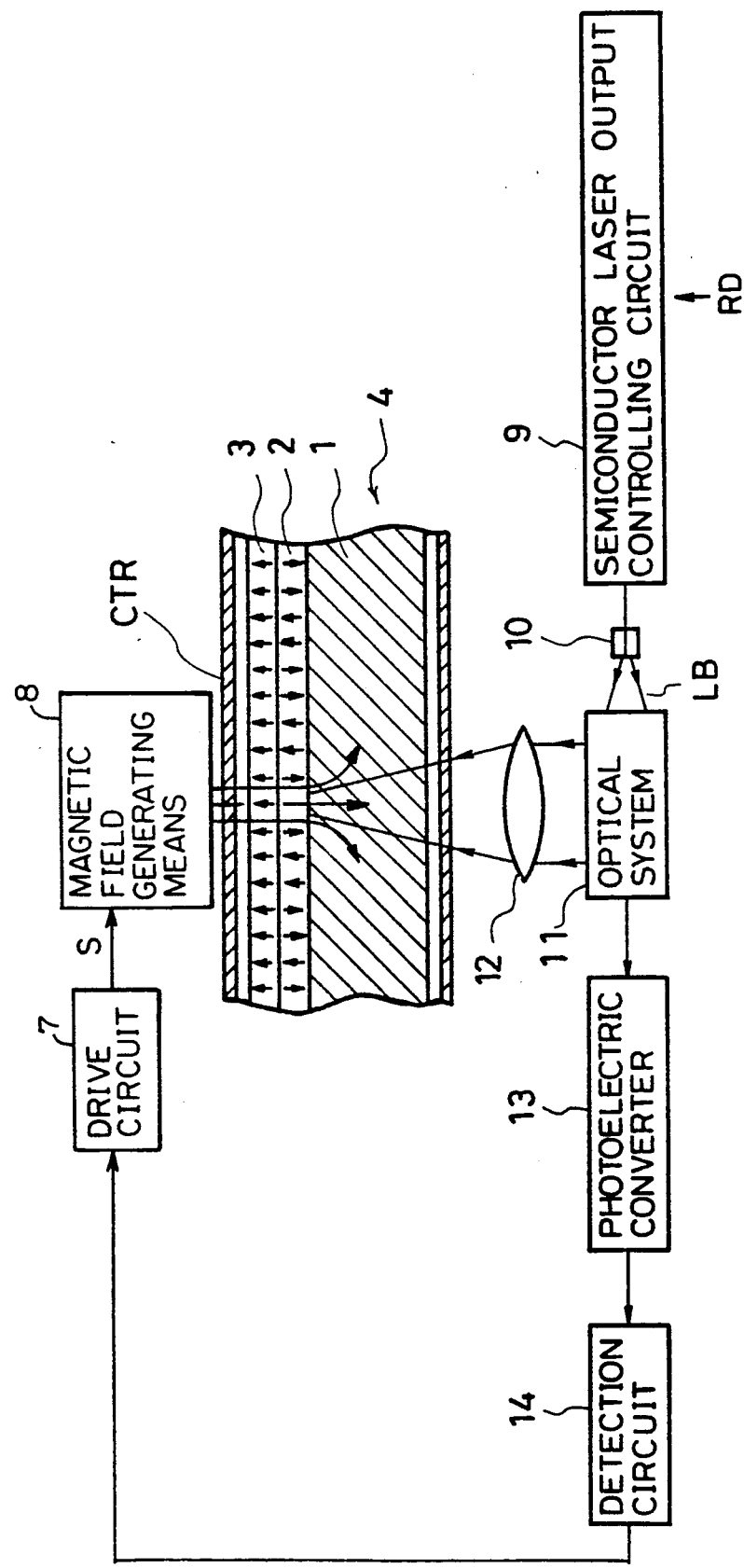
FIG. 6 is a block diagram of essential portions of a magneto-optic recording system in accordance with third and fourth aspects of the invention.

FIG. 6 is a block diagram illustrating essential portions of a magneto-optic recording system in accordance with a third aspect of the present invention. The reflected light of the light beam LB from the magneto-optic recording medium 4 is obtained through the optical system 11, and is made incident upon a photoelectric converter 13. The signal subjected to photoelectric conversion is inputted to a detection circuit 14 for detecting the direction of magnetization of the second magnetic layer 3 of the magneto-optic recording medium 4 on the basis of that signal. The detection signal of the detection circuit 14 is inputted to the drive circuit 7, and the drive signal S outputted by the drive circuit 7 is inputted to the magnetic field generating means 8. The other arrangements are similar to those of the magneto-optic recording system shown in FIG. 3 excepting that the magnetization direction indication reading unit 5 and the detection circuit 6 are omitted.

In this magneto-optic recording medium 4, an unillustrated control track, in which magnetization information made to correspond to the direction of magnetization of the second magnetic layer 3 of the magneto-optic recording medium 4 is recorded, is provided in the innermost peripheral position of the magneto-optic recording medium. After this magneto-optic recording medium 4 is loaded in the magneto-optic recording system, the light beam LB made emergent by the semiconductor laser 10 is first projected onto the unillustrated control track of the magneto-optic recording medium 4. Then, the light beam reflected from the control track is made incident upon the photoelectric converter 13. The reproduction signal of magnetization information obtained by subjecting the reflected light beam to photoelectric conversion is inputted to the detection circuit 14 so as to detect the direction of magnetization of the second magnetic layer 3 on the basis of the magnetization information of the control track. This detection signal is inputted to the drive circuit 7, and the drive signal S outputted from the drive circuit 7 causes the magnetic field generating means 8 to determine the direction of a magnetic field on the basis of the direction of magnetization detected. As a result, a magnetic field oriented in the opposite direction to that of magnetization of the second magnetic layer 3 is imparted to the loaded magneto-optic recording medium in the same way as the magneto-optic recording system shown in FIG. 3.

Then, by changing the optical output of the semiconductor laser 10 in connection with the recording signal RD, as shown in FIG. 9, information can be recorded or erased with respect to the first magnetic layer 2 in the same way as described above.

Accordingly, in this magneto-optic recording system, in the case where magnetization information on the direction of magnetization of the second magnetic layer 3 is recorded in the control track of the loaded magneto-optic recording medium 4, the direction of the magnetic field of the magnetic field generating means 8 is set in the opposite direction to the magnetization direction of the second magnetic layer 3 of the magneto-optic recording medium 4, as described above, so that information can be recorded positively even when the direction of magnetization of the second magnetic layer 3 is oriented in either direction. In addition, a similar recording operation can be effected if the magnetic field generating means 8 of this magneto-optic recording system is replaced by the magnetic field generating means shown in FIG. 5.

FIG. 6 is also a block diagram of essential portions of a magneto-optic recording system for illustrating a fourth aspect of the invention. In cases where the magnetization information on the direction of magnetization of the second magnetic layer 3 has not been recorded in the control track of the magneto-optic recording medium 4 loaded in the magneto-optic recording system, after appropriate information is recorded on a test basis on the loaded magneto-optic recording medium 4, that recorded information is reproduced by the photoelectric converter 13, and that reproduced signal is inputted to the detection circuit 14 so as to ascertain on the basis of the level of the reproduction signal whether or not information has been recorded, i.e., whether the direction of the magnetic field of the magnetic field generating means 8 is opposite to the direction of magnetization of the second magnetic layer 3. Namely, if the direction of magnetization of the second magnetic layer 3 of the loaded magneto-optic recording medium 4 is the same as the direction of the magnetic field of the magnetic field generating means 8, information will not be recorded even if the output of the light beam LB is the high output $P_H$. Hence, the level of the reproduction signal in that case becomes low. In consequence, the detection circuit 14 detects that the direction of magnetization of the second magnetic layer 3 is the same as the direction of the magnetic field of the magnetic field generating means 8. The output signal of this detection circuit 14 is inputted to the drive circuit 7, and the drive circuit 7, in turn, imparts to the magnetic field generating means 8 the drive signal S for reversing the direction of the magnetic field generated by the magnetic field generating means 8, as described above. Then, the direction of the magnetic field of the magnetic field generating means 8 becomes opposite to the direction of magnetization of the second magnetic layer 3. As a result, the optical output of the semiconductor laser 10 is changed in connection with the recording signal RD, as shown in FIG. 9C, whereby information can be recorded or erased with respect to the first magnetic layer 2 of the magneto-optic recording medium 4 in the same way as described above.

FIG. 7 is a block diagram of essential portions of a magneto-optic recording system in accordance with a fifth aspect of the invention. The cartridge CTR accommodating the magneto-optic recording medium 4 is provided with the magnetization direction indicating reading unit 5 for reading the contents of the magnetization direction indication portion which indicates the direction of magnetization of the second magnetic layer 3. The signal representing the direction of magnetization which has been read is inputted to the detection circuit 6. The detection circuit 6 is arranged to detect the direction of magnetization of the second magnetic layer 3 on the basis of the signal which has been read, and its detection signal is inputted to the drive circuit 7 and the semiconductor laser output controlling circuit 9. The drive signal S outputted by the drive circuit 7 is imparted to the magnetic field generating means 8. The drive signal S is a signal for setting the direction of the magnetic field of the magnetic field generating means 8 in the opposite direction to the direction of magnetization of the second magnetic layer 3. The semiconductor laser output controlling circuit 9 is arranged to change the optical output of the semiconductor laser 10 to low output or high output on the basis of the detection signal from the detection circuit 6, i.e., on the basis of the direction of magnetization of the second magnetic layer 3. The magnetic field generating means 8 is arranged in the same way as shown in FIG. 4. The other arrangements are similar to those of the magneto-optic recording medium shown in FIG. 3.

A description will now be given of the operation of recording information by using this magneto-optic recording system. When the cartridge CTR accommodating the magneto-optic recording medium 4 is loaded in the magneto-optic recording system, the contents indicated by the magnetization direction indicating portion on the cartridge CTR are read by the magnetization direction indication reading unit 5, and the signal thus read is inputted to the detection circuit 6. On the basis of the signal thus read, the detection circuit 6 detects the direction of magnetization of the second magnetic layer 3 of the magneto-optic recording medium 4 being loaded. The detection signal is inputted to the drive circuit 7 and the semiconductor laser output controlling circuit 9. Then, if the detected direction of magnetization of the second magnetic layer 3 is oriented away from the substrate 1, as shown in FIG. 9B, the changeover switch 82 is changed over by the drive signal S of the drive circuit 7, as shown in FIG. 4A, thereby imparting to the magneto-optic recording medium 4 the +H magnetic field oriented in the opposite direction to the direction of magnetization of the second magnetic layer 3. At the same time, the semiconductor laser output controlling circuit 9 changes the optical output of the semiconductor laser 10 to high output $P_H$ during the time when the recording signal RD shown in FIG. 9A is "1", as shown in FIG. 9C, and to low output $P_L$ during the time when it is "0". Then, during the recording signal RD is "1", the first magnetic layer 2 is magnetized in the direction of the +H magnetic field of the magnetic field generating means 8, i.e., in the direction toward the substrate 1, thereby recording information. Meanwhile, during the period of "0", the first magnetic layer 2 is magnetized in the same direction as that of the second magnetic layer 3, thereby erasing the information.

Meanwhile, in cases where the magneto-optic recording medium 4 in which the direction of magnetization of the second magnetic layer 3 is opposite to the one shown in FIG. 9B, i.e., is oriented toward the substrate 1, as shown in FIG. 9D, is loaded in the magneto-optic recording system, the detection circuit 6 detects the direction of magnetization oriented toward the substrate 1 in the same way as described above. Then, the changeover switch 82 of the magnetic field generating means 8 is changed over by the drive signal S as shown in FIG. 4B. As a result, the −H magnetic field shown in FIG. 9D, i.e., a magnetic field oriented in the opposite direction to the direction of magnetization of the second magnetic layer 3, is imparted to the magneto-optic recording medium 4. Meanwhile, as for the semiconductor laser output controlling circuit 9, during the time when the recording signal RD shown in FIG. 9A is "1", the optical output of the semiconductor laser 10 becomes low output $P_L$, as shown in FIG. 9E, so that the first magnetic layer 2 is magnetized in the same direction as that of the second magnetic layer 3, i.e., in the direction toward the substrate 1. In addition, during the time when the recording signal RD is "0", the optical output of the semiconductor laser 10 becomes high output $P_H$, so that the first magnetic layer 2 is magnetized in the same direction as that of the magnetic field of the magnetic field generating means 8. Furthermore, since the magneto-optic recording system is arranged such that the direction of the magnetic field of the magnetic field generating means 8 is set in the opposite direction to the direction of magnetization, in correspondence with the direction of magnetization of the second magnetic layer 3 of the loaded magneto-optic recording medium 4, and the optical output of the semiconductor laser 10 is changed in correspondence with the direction of magnetization of the second magnetic layer 3, so that the recorded state of the information recorded in the first magnetic layer 2 does not become contradictory. Consequently, in cases where the same information is recorded and reproduced by using magneto-optic recording media in which the directions of magnetization of the second magnetic layer 3 are different, it is possible to obtain signals of the same polarity.

Accordingly, if the cartridge CTR accommodating the magneto-optic recording medium 4 is loaded in the magneto-optic recording system, the direction of magnetization of the second magnetic layer 3 is detected from the contents of the magnetization direction indicating portion A indicated on the cartridge CTR, and a magnetic field oriented in the opposite direction to that direction of magnetization as well as the optical output of the semiconductor laser 10 based on that direction of magnetization are applied to the magneto-optic recording medium 4, as described above. Hence, it is possible to record information under the same conditions irrespective of the direction of magnetization of the second magnetic layer 3.

FIG. 8 is a block diagram of essential portions of a magneto-optic recording system in accordance with a sixth aspect of the invention. The output of the photoelectric converter 13 for subjecting the reflected light beam from the magneto-optic recording medium 4 obtained from the optical system 11 to photoelectric conversion is inputted to the detecting circuit 14 for detecting the direction of magnetization of the second magnetic layer 3. The output signal of the detection circuit 14 is inputted to the drive circuit 7 for inverting the direction of the magnetic field generated by the magnetic field generating means 8 and outputting the drive signal S and also to the semiconductor laser output controlling circuit 9. In addition, the drive signal S of the drive circuit 7 is imparted to the magnetic field generating means 8. The other arrangements are similar to those of the magneto-optic recording system shown in FIG. 6.

This magneto-optic recording system is arranged such that in cases where magnetization information on the direction of magnetization of the second magnetic layer 3 is recorded in an unillustrated control track of the loaded magneto-optic recording medium 4, a light beam is first projected onto the control track, and the magnetization information is reproduced by the photoelectric converter 13 on the basis of that reflected light beam. The reproduction signal is inputted to the detection circuit 14 so as to detect the direction of magnetization of the second magnetic layer 3 on the basis of the magnetization information. The detection signal is inputted to the drive circuit 7 and the semiconductor laser output controlling circuit 9. As a result, a magnetic field oriented in the opposite direction to the detected direction of magnetization of the second magnetic layer 3 is applied to the magneto-optic recording medium 4 in the same way as described before, and the optical output of the semiconductor laser 10 is made to correspond to the direction of magnetization of the second magnetic layer 3, thereby recording or erasing information with respect to the first magnetic layer 2 in a similar manner.

Accordingly, in cases where the magneto-optic recording medium 4 in which magnetization information on the direction of magnetization of the second magnetic layer 3 is recorded in the control track of the magneto-optic recording medium 4 is loaded in this magneto-optic recording system, that magnetization information is reproduced to detect the direction of magnetization of the second magnetic layer 3. As a result, information can be recorded in the magneto-optic recording medium 4 irrespective of the direction of magnetization of the second magnetic layer 3 by using this magneto-optic recording system.

FIG. 8 is also a block diagram of essential portions of a magneto-optic recording system for illustrating a seventh aspect of the invention. In cases where magnetization information on the direction of magnetization of the second magnetic layer 3 has not been recorded in the unillustrated control track of the magneto-optic recording medium 4 loaded in the magneto-optic recording system, after appropriate information is recorded on a test basis on the loaded magneto-optic recording medium 4, that recorded information is reproduced by the photoelectric converter 13, and that reproduced signal is inputted to the detection circuit 14 so as to ascertain on the basis of the level of the reproduction signal whether or not information has been recorded, i.e., whether the direction of the magnetic field of the magnetic field generating means 8 is opposite to the direction of magnetization of the second magnetic layer 3. Namely, if the direction of magnetization of the second magnetic layer 3 of the loaded magneto-optic recording medium 4 is the same as the direction of the magnetic field of the magnetic field generating means 8, information will not be recorded even if the output of the light beam LB is the high output $P_H$, as described before. Hence, the level of the reproduction signal in that case becomes low. Then, the direction of the magnetic field of the magnetic field generating means 8 is reversed by the low-level reproduction signal detected, and the optical output of the semiconductor laser 10 is changed to the optical output corresponding to the direction of magnetization of the second magnetic layer 3, as described earlier. Consequently, information is recorded or erased with respect to the magneto-optic recording medium 4 in the same way as the case where magnetization information is reproduced from the control track. Consequently, with this magneto-optic recording system as well, it is possible to record information positively even if the direction of magnetization of the second magnetic layer 3 of the magneto-optic recording medium 4 loaded therein is oriented in either direction.

It should be noted that although in the foregoing embodiments a description has been given of recording and erasing of information, it is possible to reproduce information recorded in the first magnetic layer 2 by setting the optical output of the semiconductor laser 10 to reproduction output $P_R$ which is further lower than the low output $P_L$ and by detecting the reflected light beam.

In addition, it goes without saying that similar advantages can be obtained if the prevent invention is applied to a magneto-optic recording and reproducing system in a similar manner.

In cases where information is recorded by using the magneto-optic recording system in accordance with the second, third, or fourth aspect of the invention, the state in which information is recorded differs depending on the direction of magnetization of the second magnetic layer of the magneto-optic recording medium, as described before. Hence, in cases where information is to be reproduced from the magneto-optic recording medium 4 whose direction of magnetization is oriented toward the substrate 1, it is necessary to reverse the polarity of the reproduced signals. In addition, in cases where information has been recorded by using the magneto-optic recording system in accordance with the fifth, sixth, or seventh aspect of the invention, it is not necessary to reverse the polarity of the reproduction signals of information.

Figure 10:
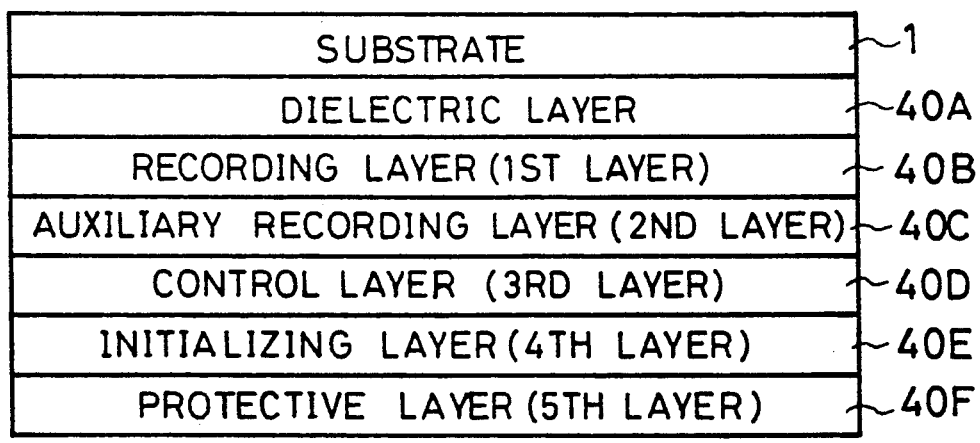
FIG. 10 is an enlarged cross-sectional view of a magneto-optic recording medium having four magnetic layers in accordance with another embodiment of the invention.

FIG. 10 illustrates a magneto-optic recording medium in accordance with a further embodiment of the invention, in which four magnetic layers are provided.

This magneto-optic recording medium 4 has a dielectric layer 40A disposed on the substrate 1 formed of, for instance, glass. A recording layer 40B, an auxiliary recording layer 40C, a control layer 40D, an initializing layer 40E, and a protective layer 40F are laminated on the dielectric layer 40A in that order. It should be noted that the recording layer 40B (first layer) and the initializing layer 40B (fourth layer) have the same functions as those of the first magnetic layer 2 and the second magnetic layer 3 of the above-described magneto-optic recording medium having the first magnetic layer 2 and the sxecond magnetic layer 3.

Each of the layers is formed by sputtering or other similar process with the materials and thicknesses, for instance, shown in Table 1 below.

TABLE 1

| Layer | Material | Thickness |
| --- | --- | --- |
| Dielectric layer 40A | $SiN_x$ | 65 nm |
| Recording layer 40B | $Tb_{22}Fe_{69}Co_9$ | 80 nm |
| Auxiliary recording layer 40C | $Gd_8Dy_{17}Fe_{60}Co_{15}$ | 150 nm |
| Control layer 40D | $Tb_{30}Fe_{84}$ | 20 nm |
| Initializing layer 40E | $Tb_{30}Co_{70}$ | 40 nm |
| Protective layer 40F | $SiN_x$ | 70 nm |

These magnetic layers have the following characteristics: Adjacent magnetic layers are coupled with each other by means of the exchange force. The recording layer (first layer) 40B effects the recording and holding of information. The auxiliary recording layer (second layer) 40C, the control layer (third layer) 40D, and the initializing layer (fourth layer) 40E do not have the function of holding information and are additional layers permitting direct overwriting through optical modulation. The initializing layer 40E does not undergo a reversal of auxiliary-lattice magnetization within its temperature range with respect to a temperature rise due to irradiation with a laser beam and serves to oppose a bias magnetic field. The control layer 40D serves to interrupt an exchange force from the initializing layer 40E in a high-temperature range.

Here, it is assumed that $T_{Ci}$ is the Curie temperature of an i-th layer (where i=1, 2, 3 or 4), that $H_{Ci}$ is the width of a magnetic field (corresponding to a coersive force) which is half that of a reversed magnetic field of the i-th layer, and that $H_{wi}$ is an exchange force to which the i-th layer receives from the adjacent magnetic layer (this exchange force corresponds to the transition width of a loop in the i-th layer and is defined for a reversal of magnetization as shown in FIG. 11 with respect to the second and third layers).

Figure 11A:
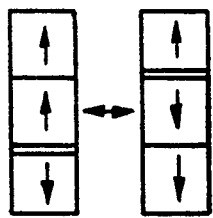
FIG. 11(a) is a first conceptual diagram illustrating auxiliary-lattice magnetization.
Figure 11B:
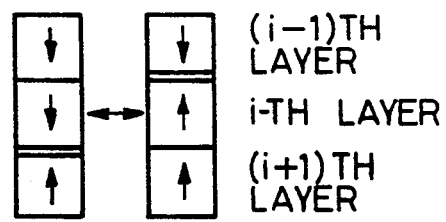
FIG. 11(b) is a second conceptual diagram illustrating auxiliary-lattice magnetization.

FIG. 11 shows a conceptual diagram of auxiliary-lattice magnetization. Here, if the i-th layer is assumed to be, for instance, the third layer, the directions of the third layer and layers adjacent thereto, i.e., the second and fourth layers, are shown in FIGS. 11A and 11B. In addition, in cases where the direction of magnetization of the (i−1)th layer and the direction of magnetization of the (i+1)th layer are mutually opposite to each other, as shown in FIG. 11A, the direction of magnetization of the i-th layer becomes that of the (i−1)th layer or the (i+1)th layer. Meanwhile, in cases where direction of magnetization of the (i−1)th layer and the direction of magnetization of the (i+1)th layer are mutually approaching directions, as shown in FIG. 11B, the direction of magnetization of the i-th layer becomes oriented toward the (i+1)th layer or the (i−1)th layer.

After having thus defined, the magnetization characteristics are given as $T_{C4} > (T_{comp4}) > T_{C2} > T_{C1} > (T_{comp2}) > T_{C3} >$ - room temperature . . . (1)

Recording layer 40B:
$H_{W1} < H_{C1}$: up to room temperature . . . (2)
$H_{W1} > H_{C1}$: up to $T_{C1}$. . . . (3)

Auxiliary recording layer 40C:
$H_{W2} > H_{C2}$: up to $T_{C3}$ . . . (4)
$H_{W2} > H_{C2}$: up to $T_{C1}$. . . . (5)

Control layer 40D:
$H_{W3} > H_{C3}$: up to $T_{C3}$ . . . (6)

Initializing layer 40E:
$H_{W4} < H_{C4}$: up to an operating temperature range . . . (7)

(where $T_{comp2}$ and $T_{comp4}$ are compensation temperatures for the second and fourth layers). Formula (2) shows that the magnetization of the recording layer 40B at room temperature is not reversed by the reversal of magnetization of the auxiliary recording layer 40C. Formulae (4), (6) and (7) show that the directions of magnetization of the auxiliary recording layer 40C, the control layer 40B, and the initializing layer 40E at room temperature are uniformly oriented downward after recording.

This magneto-optic recording medium having four magnetic layers also makes it possible to record and reproduce information in the same way as the magneto-optic recording medium in accordance with the above-described embodiment of the invention.

As described above, the magneto-optic recording medium in accordance with the first aspect of the invention is capable of indicating the direction of magnetization of the second magnetic layer. In addition, the magneto-optic recording systems in accordance with the second to seventh aspects of the invention make it possible to record or erase information irrespectively of the direction of magnetization of the second magnetic layer of the magneto-optic recording medium adapted to record information by being loaded therein. Accordingly, even if the direction of magnetization of the second magnetic layer of the magneto-optic recording medium differs for each of its manufacturers, information can be recorded or erased with respect to the magneto-optic recording media made by various manufacturers, by means of a single magneto-optic recording system. Hence, there is an outstanding advantage in that equipment costs can be reduced on the part of those who record information in the magneto-optic recording medium.

What is claimed is:

1. A magneto-optic recording system for recording information by irradiating a light beam and applying a magnetic field to a magneto-optic recording medium, said system comprising said recording medium having a first magnetic layer for information to be recorded thereon and a second magnetic layer superposed on said first magnetic layer, having a magnetization direction being fixed in one direction for effecting the recording of information in said first magnetic layer, wherein magnetization information on the magnetization direction of said second magnetic layer is recorded in said first magnetic layer, means for reading the magnetization information on the magnetization direction of said second magnetic layer in the first magnetic layer; means for detecting the magnetization direction of said second magnetic layer from the output of said reading means; magnetic field generating means, including a drive circuit means responsive to said detecting means, for generating said magnetic field and adjusting the direction of said magnetic field opposite to the detected magnetization direction of said second magnetic layer; and optical means for irradiating said light beam to said medium.

2. A method of magneto-optic recording for recording information by irradiating a light beam and applying a magnetic field to a magneto-optic recording medium, said method comprising the steps of: providing said recording medium having a first magnetic layer for information to be recorded thereon and a second magnetic layer superposed on said first magnetic layer, having a magnetization direction being fixed in one direction for effecting the recording of information in said first magnetic layer, recording magnetization information on the magnetization direction of said second magnetic layer in said first magnetic layer, reading the magnetization information recorded in said first magnetic layer; detecting the magnetization direction of said second magnetic layer from the magnetization information read; applying said magnetic field to the medium and adjusting the direction of said magnetic field opposite to the detected magnetization direction of said second magnetic layer; and irradiating said light beam to the medium.

3. A magneto-optic recording system for recording information by irradiating a light beam and applying a magnetic field to a magneto-optic recording medium, said system comprising said recording medium having a first magnetic layer for information to be recorded thereon and a second magnetic layer superposed on said first magnetic layer, having a magnetization direction being fixed in one direction for effecting the recording of information in said first magnetic layer, wherein magnetization information on the magnetization direction of said second magnetic layer is recorded in said first magnetic layer, means for reading the magnetization information on the magnetization direction of said second magnetic layer in the first magnetic layer; means for detecting the magnetization direction of said second magnetic layer from the output of said reading means; magnetic field generating means, including a drive circuit means responsive to said detecting means, for generating said magnetic field and adjusting the direction of said magnetic field opposite to the detected magnetization direction of said second magnetic layer; optical means for irradiating said light beam to the medium; and light beam controlling means for changing the output of said optical means in accordance to the output of said detecting means.

4. A method of magneto-optic recording for recording information by irradiating a light beam and applying a magnetic field to a magneto-optic recording medium, said method comprising the steps of: providing said recording medium having a first magnetic layer for information to be recorded thereon and a second magnetic layer superposed on said first magnetic layer, having a magnetization direction being fixed in one direction for effecting the recording of information in said first magnetic layer, recording magnetization information on the magnetization direction of said second magnetic layer in said first magnetic layer, reading the magnetization information recorded in said first magnetic layer; detecting the magnetization direction of said second magnetic layer from the magnetization information read; applying said magnetic field to said medium a magnetic field oriented in an opposite direction to the direction of magnetization detected; and adjusting the direction of said magnetic field opposite to the detected magnetization direction of said second magnetic layer; and changing the light beam output in accordance to the detected magnetization direction of said second magnetic layer; and irradiating the light beam to said medium.

* * * * *